May 7, 1935. O. M. EDWARDS ET AL 2,000,511
SELF CONTAINED WINDOW STRUCTURE
Filed Aug. 23, 1929 3 Sheets-Sheet 1

Oliver M. Edwards + Wm T. Aye
INVENTORS

BY Budell + Thompson
ATTORNEYS.

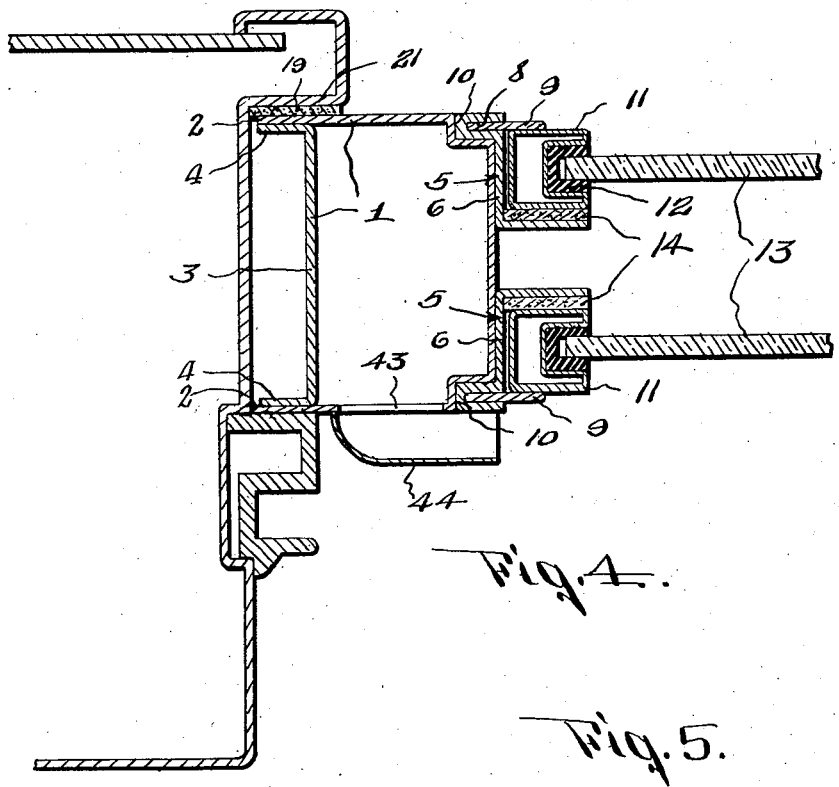
Fig. 4.
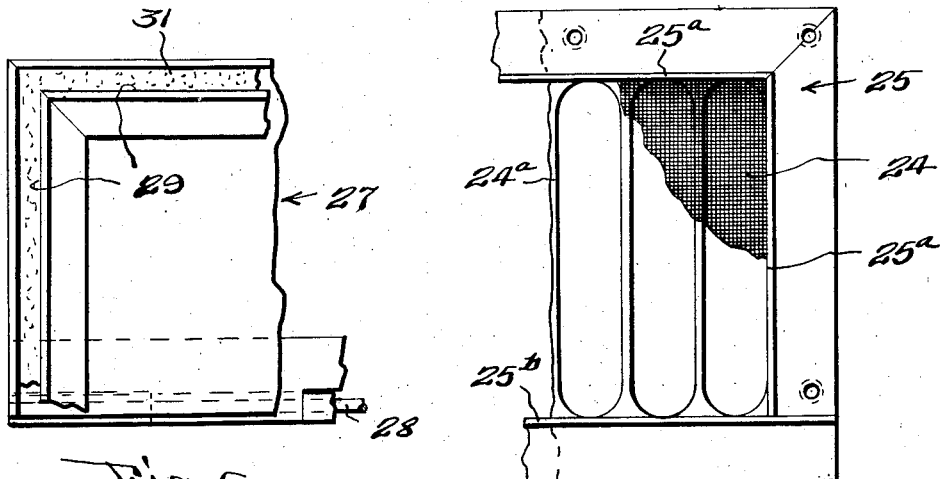
Fig. 5.
Fig. 6.

Patented May 7, 1935

2,000,511

UNITED STATES PATENT OFFICE 2,000,511

SELF CONTAINED WINDOW STRUCTURE

Oliver M. Edwards and Roy T. Axe, Syracuse, N. Y., assignors, by mesne assignments, to The Syracuse Trust Company, Syracuse, N. Y., a corporation of New York, trustee Application August 28, 1929, Serial No. 389,057

10 Claims. (Cl. 98—88)

This invention relates to window constructions, and has for its object, a self contained window construction including the window frame, and a sash, or other means for supporting the window pane, which unitary structure with all pertinent parts can be assembled and accurately fitted at the factory and the unitary structure applied or fitted to the opening of the structure as a railway car, or any other structure, without disturbing the window construction and pertinent parts, regardless of inaccuracies in the opening in which the window construction is to be applied, all whereby, the essential parts of the window construction which work together and must be accurately fitted together, are not disturbed by the unskilled workmen employed in applying the window construction in the window opening.

Heretofore, the component parts such as the sash, window fixtures and sash guides have been assembled by the car builder in the window opening and difficulties often occurred, due to variations in said window opening, causing faulty applications by the workman.

The invention consists in the novel features and in the combinations and constructions hereinafter set forth and claimed.

In describing this invention, reference is had to the accompanying drawings, in which like characters designate corresponding parts in all the views.

Figure 4 is a transverse, sectional view through one of the side members of the window frame, the contiguous part of the opening in the structure to which the window is applied, being also shown.

Figure 5 is an enlarged, fragmentary rear elevation of the ventilator frame, parts of the ventilator being removed.

Figure 6 is a fragmentary face view of the movable ventilator member.

Figure 1:
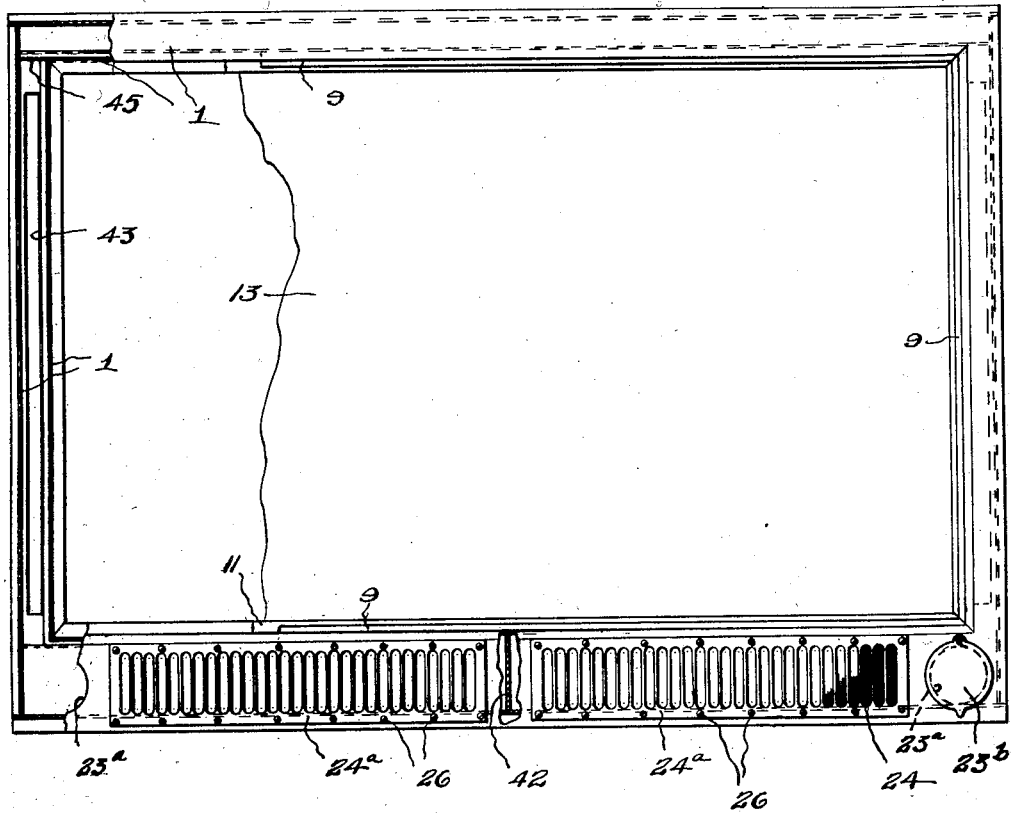
Figure 1 is a front elevation, partly broken away, of a window construction embodying my invention.
Figure 2:
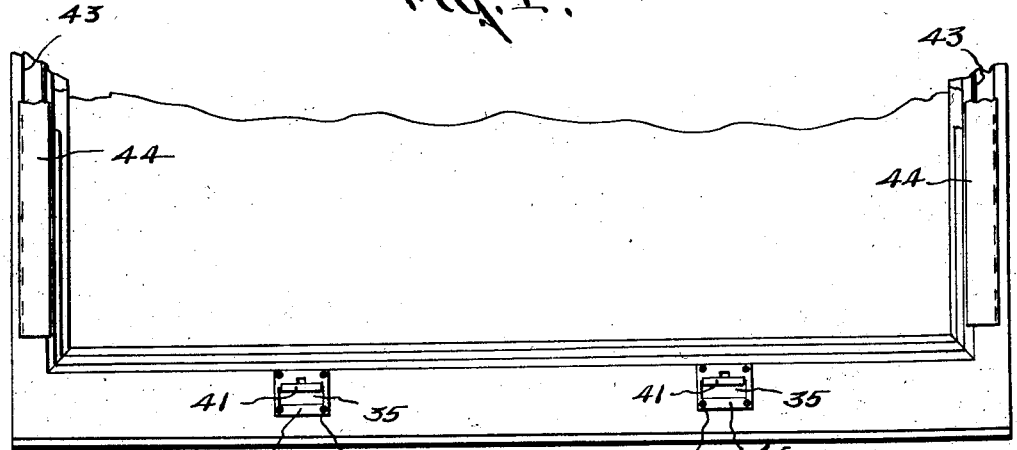
Figure 2 is a fragmentary opposite side elevation from that seen in Figure 1.
Figure 3:
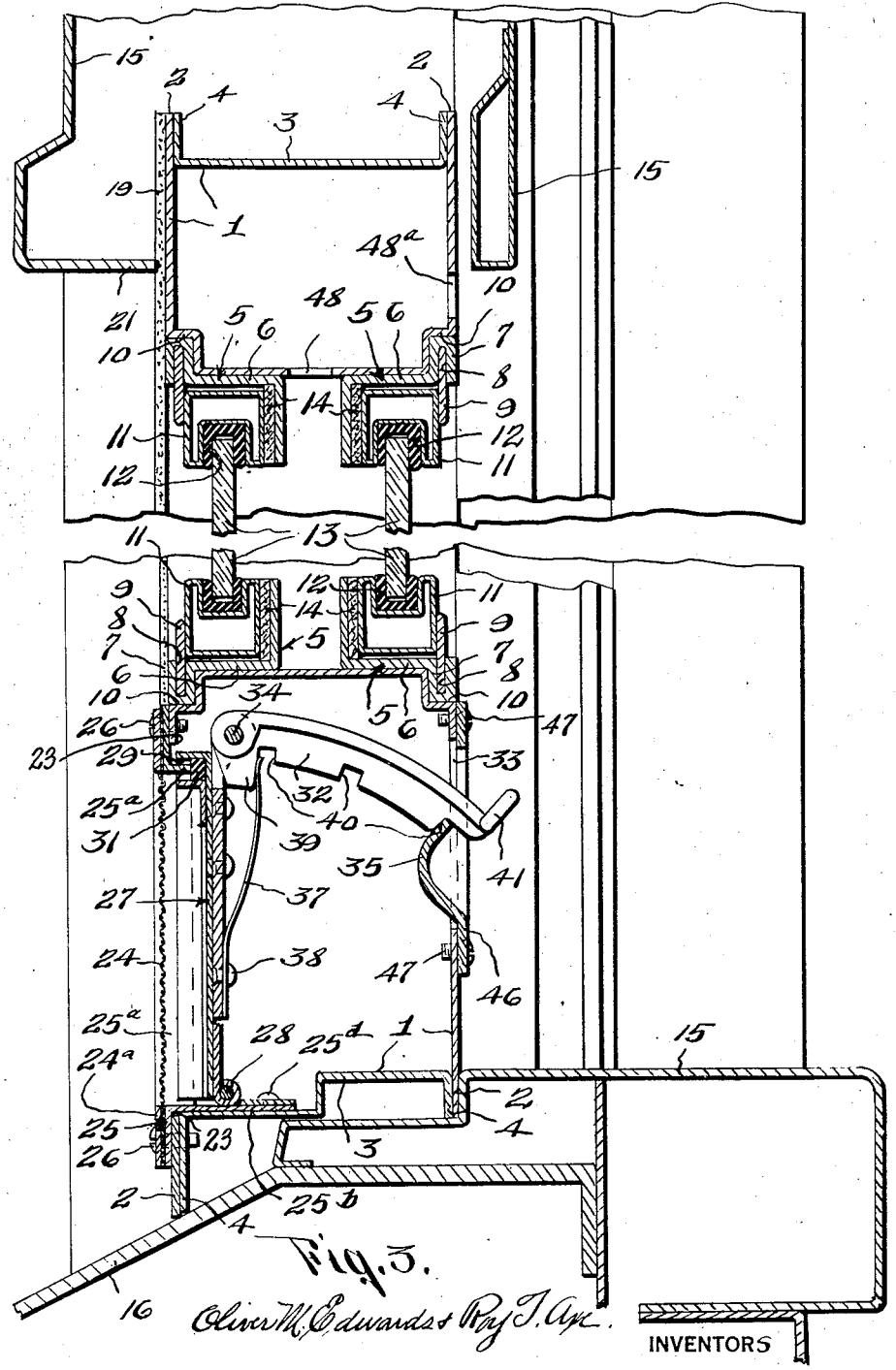
Figure 3 is an enlarged, fragmentary, vertical sectional view through this window construction, the contiguous part of the structure formed with the window opening being also shown.

This window structure comprises generally, a window frame provided with means for carrying the glass pane and having outwardly extending marginal or circumferential flanges admitting the fitting to the opening in the structure, as a car structure, to which the window is to be applied, the metal flanges being designed to be trimmed off to fit the opening.

It further includes a frame member provided with a ventilator for receiving air from the outside of the structure, or the car, and an outlet opening on the inner side of the frame in a different member from that in which the ventilator is provided and deflectors in line with the outlet opening, so as to deflect the air currents so that they will not strike directly against persons within the structure adjacent the window.

The window construction is particularly designed for railway cars and motor busses, although it is applicable to other structures. It is particularly designed for large stationary windows which have no opening and closing movement, such as for instance, dining car windows.

I designates the frame, which is preferably formed hollow and of sheet metal in any suitable manner, this frame being provided with outwardly extending marginal flanges 2 which can be trimmed off to accurately fit the walls of the opening in the structure in which the window is applied.

The members of the frame formed up of sheet metal are here shown as so formed as to be rectangular in general form in cross section and channel shaped with the open side of the channel at the edge of the frame, the open side of the channel formation being closed by a plate 3 inset from the edge and having flanges 4 lapping the inner sides of the flanges 2 and secured thereto as by welding.

The frame is provided with any means for carrying the glass pane and it is here shown as provided with a sash holding strip 5. The sash holding strip 5 is here shown as a separate piece from the frame itself, but is a unit with the frame and may be integral with the frame. Preferably, however, this means of sash holding strip 5 is separable from the frame and united therewith as a unit. The sash holding strip 5 as here shown, is formed up of sheet metal into angular form, one side 6 of the angle formation abutting against the inner wall of the frame 1, and the other side projecting into the opening enclosed by the frame and forming a window stop. The side 6 is provided with an outwardly bent flange 7 bent upon itself to form a groove 8 which receives a retaining strip 9 for holding the sash to be described, in position. The angular flange 7 is seated in an inset or rabbet 10 formed at the inner corner of the frame structure 1.

11 is the sash located in the sash strip and this is formed with a reentrant channel 12 in which the glass pane 13 is mounted. A suitable filler or weather strip 14 is inserted between the sash and the flange forming the inner window stop. The retaining strip 9 bears against the other side of the sash.

The sash 11 and its holding strip 5 is the means provided on the window frame for holding the glass pane, although it will be understood that the pane 13 may be mounted directly in a reentrant channel provided in the frame 1 itself.

In the window here shown, there are two panes 13 spaced apart in the frame 1.

15 is the structure in which the window opening is provided. This may be of any suitable form, size and construction. It is here shown as provided with sheet metal walls and is provided with a sill portion 16 against which some of the flanges 2 abut. In fitting the window frame to the structure, these flanges are ground or otherwise trimmed off at their edges to fit against any surfaces of the structure to which the unitary window construction is applied.

A filler or weather strip 19 is usually interposed between the outer face of the frame, or the flanges thereof and the abutting wall 21 of the opening of the structure to which the frame is applied.

One of the frame members, preferably, the lower frame member is formed with ventilating means and as here illustrated, the front wall of the lower member is formed with an opening 23 which is covered by a screen 24, the screen being mounted in a marginal frame 25. The marginal frame 25 comprises an inner angular section fitted in the opening 23 and an outer section for retaining the screen 24. One flange of the inner angular section laps the outer face of the front wall of the lower frame member around the screen opening and the other flange extends through said opening. The flanges 25ª on the top and two ends of the frame 25 extend but a short distance through the opening 23. The portion 25ᵇ of the flange at the bottom of the frame 25 extends farther through the opening 23 and laps or rests on the inner face of the edge wall 3 which closes the lower member of the frame 1. One of the hinge leaves of the piano hinge of the closure for the screen opening laps this flange 25ᵇ and this portion 25ᵇ and the hinge leaf is secured to the edge wall 3 of the lower member of the frame 1 in any suitable manner as by rivets 25ᵈ. The margins of the screen 24 and also of a slotted plate 24ª extend between the two sections of the frame 25. The sections of the frame 25 are secured together in the screen opening as by screws 26.

The front wall of the lower frame member is provided with one or more clean out openings normally closed by covers. As here shown, the clean out openings 23ª are provided at the ends of the lower frame member so that a brush or other tool can be inserted into the lower frame member through the holes 23ª to clean out dirt that may accumulate between the screen 24 and the closure 27, especially about the hinge of the closure. 23ᵇ are pivoted closures for the clean out openings.

The opening which is protected by the screen 24, is closed against the inlet of air by a shutter 27 here shown as pivoted at 28, preferably by a piano hinge, to the lower wall of the bottom member of the frame as before described, this closure having a forwardly facing channel 29 at its top and side edges for receiving a corresponding inwardly extending flange 25ª provided on the screen frame 25. A suitable buffer or weather strip 31 is located in the channel 29 in which the edge of the flange 25ª compresses when the shutter is closed.

The shutter is operated by suitable means here illustrated, as an arm 32 extending transversely into the lower frame member through a passage 33 at the inner side thereof and being pivotally connected at 34 to the upper edge of the shutter in order to have a slight pivotal movement to disengage it from a latch plate 35 projecting into the opening 33. A spring as a leaf spring 37 acts on the latch 32 to move it into latching position. The spring 37 is secured at 38 to the shutter and the free end thereof, presses against a depending angular arm 39 at the inner end of the latch 32. The latch has a plurality of notches 40 for coacting with the latch plate 35 when the shutter is closed, fully open and partly open. The shutter has a hand engaging portion 41 at its outer end.

In operation, the latch is first lifted up to clear the latch plate and then, pulled outwardly until an intermediate notch 40 latches over the latch plate 35. To close the shutter, the latch is again lifted against the action of its spring and the handle 41 pushed inwardly. When the handle is released, the spring 37 will move the handle 32 to its locked position. When the shutter is open, obviously, air can blow in through the screen and the slots into the interior of the lower member of the frame 1.

Preferably, in relatively wide windows, the lower frame member 1 is divided into two compartments by a partition 42 and there is a shutter 27 in each compartment.

The side or upright members of the frame 1 are also formed hollow and communicate with the interior of the lower member of the frame 1 and have outlets extending lengthwise thereof into the interior of the car or other structure, so that the air passes from the lower member up into the side members before going out into the car or other structure, and in order to avoid the creation of a direct draft, deflectors as 44 are provided in line with the outlet openings 43, these deflectors being directed toward the middle of the window.

Owing to this arrangement of the outlet openings 43 and the deflectors 44, the currents of air passing in through the screen 24 when the shutter 27 is open, pass around several angles that not only baffle the currents of air, but also tend to separate particles of dust from the air before the air passes out through the outlet openings into the interior of the structure. The upper ends of the side or upright members of the frame are closed against the outlet of air into the top frame member, by the partition 45. The latch plate 35 is formed on a base plate 46 which is secured to the bottom rail of the sash, the base plate being formed with an opening, through which the handle end 41 of the lever 32 extends. The plate 46 is held in position by fastening members, as screws 47.

When two sheets of glass are used, in order to ventilate the space between them and to equalize the temperature and prevent the clouding up of the window panes by reason of moisture between the panes, ventilating openings 48 are provided opening into the top frame member, and the side walls of the top frame member toward the interior of the car, are formed with air holes 48ª. Thus, the space between the panes is ventilated.

In all the constructions, the clean out holes are preferably located at the ends of the hollow frame member so that a cleaning tool or a suction tool can be inserted to clean out the dust that accumulates in the hollow frame member through the ventilating opening.

This entire window construction can be built at the factory and all parts thereof accurately fitted and when the sash or pane carrying means is formed separable from the frame, it also can be accurately fitted to the frame and any fixtures on the window construction can be accurately applied, so that when the construction is delivered to the car builder, it can be fitted to the opening of the car structure without in any way disturbing the window construction except by trimming off the edges, should trimming be required, of the flanges 2 to fit slightly varying sizes of window openings and inaccuracies in the window openings. This fitting requires a less skilled class of workmen, than assembling of the window construction, and hence, the less skilled class does not have to do any skilled work on the window construction and the window construction itself being self contained, works as intended even though not skillfully applied to the window opening by the unskilled workmen, and the work done at the factory does not have to be done over again, or modified by the unskilled workmen fitting the unitary window construction to the window opening.

What we claim is:

1. In a unitary window construction, a hollow frame mountable in the frame of a window opening of a structure and having means for supporting a pane, the bottom rail of the hollow frame, which coacts with the sill portion of the window opening, being provided with air intake openings through the outer wall thereof and one of the upright frame members of the hollow frame being formed with inlet openings through its inner face, whereby air circulates from the outer side of the window through the bottom rail and from the bottom rail into the upright frame member and out through the ventilating openings.

2. In a unitary window construction, a hollow frame mountable in the frame of a window opening of a structure and a double sash mounted in the hollow frame with a space between them, the top rail of the hollow frame having an inlet opening for air and also having an opening into the space between the sashes, the bottom rail of the hollow frame, which coacts with the sill portion of the window opening, being formed with a ventilator opening through its outer wall and one of the upright members of the frame being formed with ventilator openings extending lengthwise thereof, the interior of the bottom rail communicating with the interior of the upright member and a partition separating the interior of the top rail from the interior of the upright frame member.

3. In a window construction, a frame having means for supporting a window pane, one of the frame members being hollow and formed with a screened ventilator opening, and a normally closed clean out hole in the hollow member at one end of the ventilator opening to permit the insertion of a clean out tool.

4. In a window construction, a frame having means for supporting a window pane, one of the frame members being hollow and formed with a screened ventilator opening, a closure for the ventilator opening located in the hollow member and hinged at its lower edge thereto to swing toward and from said opening, the hollow frame member being formed with normally closed clean out holes located at the ends of the hollow member to permit the insertion of a clean out tool.

5. A window construction comprising a hollow frame member formed with a ventilating opening, a closure mounted in the frame member and operable to open and close said opening, the frame member being formed with a clean-out hole located at one end of the hollow frame member.

6. A window construction comprising a hollow frame member formed with a ventilating opening in its front wall, a closure for said opening mounted within the hollow frame member and hinged within the frame member and movable inwardly and outwardly on its hinge to open and close said opening, means for operating the closure, the frame member being provided with a clean-out hole located at one end of the frame member.

7. A window construction comprising a hollow frame member formed with a ventilating opening in one wall, a closure for said opening hinged at its lower edge and movable on its hinge into and out of closed position, the frame member being provided with a clean-out hole at one end of the hollow frame member and means for operating the closure, said operating means extending through the rear wall of the hollow frame member and having a handle at its outer end.

8. A window construction comprising a hollow frame member formed with a ventilating opening, a closure mounted in the frame member and operable to open and close said opening and means for operating the closure, the hollow frame member being provided with a normally closed clean-out hole.

9. In a window construction, a frame mountable in a window opening and having means for supporting a pane, one of the horizontal members of the frame being hollow and provided with ventilator openings into the interior thereof from the outer side and with means for opening and closing said openings, and one of the upright members of the frame being hollow and communicating at one end with the hollow horizontal frame member and being closed at its other end and formed with air outlets on the interior side thereof and extending lengthwise thereof, said horizontal and vertical frame members being of a width substantially the same as that of the pane supporting means and the inner wall of said frame member in which the outlet openings are provided extending in the plane parallel to the pane, all whereby the frame members with the air passages therein, are a compact structure in a widthwise direction.

10. In a window construction, a frame mountable in a window opening and having means for supporting spaced apart panes, one of the horizontal members of the frame being hollow and provided with a ventilator opening into the interior thereof from the outer side, one of the upright members of the frame being hollow and communicating at one end with the hollow horizontal frame member and being also formed with air outlets on the interior side thereof and extending lengthwise thereof, said horizontal and vertical frame members being of a width sub- stantially the same as that of the pane supporting means and the inner wall of said frame member in which the outlet openings are provided extending in the plane parallel to the panes, all whereby the frame members with the air passages therein, are a compact structure in a widthwise direction, the other horizontal frame member being also formed hollow and having an air inlet passage and an air outlet passage, the latter opening into the space between the panes, the interior of the latter horizontal frame member being partitioned from the air passages of the other frame members.

OLIVER M. EDWARDS.
ROY T. AXE.